US012038313B2

(12) United States Patent
Fort et al.

(10) Patent No.: US 12,038,313 B2
(45) Date of Patent: Jul. 16, 2024

(54) SYSTEM AND METHOD FOR MONITORING LIQUID ADHESIVE FLOW

(71) Applicant: NORDSON CORPORATION, Westlake, OH (US)

(72) Inventors: Wesley C Fort, Cumming, GA (US); Ronald Ramspeck, Atlanta, GA (US); Enes Ramosevac, Snellville, GA (US)

(73) Assignee: Nordson Corporation, Westlake, OH (US)

( * ) Notice: Subject to any disclaimer, the term of this patent is extended or adjusted under 35 U.S.C. 154(b) by 1 day.

(21) Appl. No.: 17/335,169

(22) Filed: Jun. 1, 2021

(65) Prior Publication Data

US 2021/0285804 A1    Sep. 16, 2021

Related U.S. Application Data

(63) Continuation of application No. 15/475,442, filed on Mar. 31, 2017, now Pat. No. 11,041,745.
(Continued)

(51) Int. Cl.
*B05C 11/10*   (2006.01)
*B05B 12/00*   (2018.01)
(Continued)

(52) U.S. Cl.
CPC ............... *G01F 1/56* (2013.01); *B05B 12/00* (2013.01); *B05C 11/1007* (2013.01);
(Continued)

(58) Field of Classification Search
None
See application file for complete search history.

(56) References Cited

U.S. PATENT DOCUMENTS 2,860,658 A * 11/1958 Senesky ............. G05D 16/0663
                                                            251/86
3,969,940 A    7/1976 Butcher
(Continued)

FOREIGN PATENT DOCUMENTS

CN        1052312 C     5/2000
CN        1692991 A     11/2005
(Continued)

OTHER PUBLICATIONS

U.S. Appl. No. 15/475,442, filed Mar. 31, 2017.
(Continued)

*Primary Examiner* — Binu Thomas
(74) *Attorney, Agent, or Firm* — BakerHostetler

(57) ABSTRACT

A hot melt adhesive system includes an adhesive supply for receiving solid or semi-solid hot melt adhesive, and a heater associated with the adhesive supply for melting the solid or semi-solid hot melt adhesive into liquid hot melt adhesive. An adhesive tracking system monitors an output of the liquid hot melt adhesive, and includes a flow meter having a flow inlet and a flow outlet. The flow meter measures an amount of the adhesive flowing out of the flow outlet. A product detector may be used to sense a presence of a product to which the adhesive is applied. A controller then determines the total amount of the liquid adhesive dispensed and the average amount of liquid adhesive dispensed per product.

18 Claims, 16 Drawing Sheets

Related U.S. Application Data

(60) Provisional application No. 62/318,114, filed on Apr. 4, 2016.

(51) Int. Cl.

| | | |
|---|---|---|
| *C09J 5/00* | (2006.01) | |
| *G01F 1/56* | (2006.01) | |
| *G01F 3/10* | (2006.01) | |
| *G01F 15/18* | (2006.01) | |
| *B05C 5/02* | (2006.01) | |
| *G05D 16/06* | (2006.01) | |

(52) U.S. Cl.
CPC ...... *B05C 11/1013* (2013.01); *B05C 11/1021* (2013.01); *B05C 11/1042* (2013.01); *C09J 5/00* (2013.01); *G01F 3/10* (2013.01); *G01F 15/185* (2013.01); *B05C 5/02* (2013.01); *B05C 5/027* (2013.01); *B05C 11/1044* (2013.01); *G05D 16/06* (2013.01)

(56) References Cited

U.S. PATENT DOCUMENTS

| | | | |
|---|---|---|---|
| 5,065,695 | A | 11/1991 | Baron et al. |
| 5,251,785 | A | 10/1993 | Hayden et al. |
| 5,895,847 | A | 4/1999 | Steuer |
| 6,296,463 | B1* | 10/2001 | Allen .......... B05C 5/0279 118/315 |
| 6,579,563 | B1 | 6/2003 | Dillon |
| 6,746,712 | B2 | 6/2004 | Hoffmann et al. |
| 6,857,441 | B2 | 2/2005 | Flavelle |
| 8,496,457 | B2 | 7/2013 | Varga |
| 2001/0047754 | A1 | 12/2001 | Falck et al. |
| 2002/0178593 | A1 | 12/2002 | Kuru |
| 2005/0241576 | A1 | 11/2005 | Gaon et al. |
| 2009/0104343 | A1 | 4/2009 | Espenschied et al. |
| 2010/0199758 | A1 | 8/2010 | Tokhtuev et al. |
| 2012/0031195 | A1* | 2/2012 | Skirda .......... G01F 3/10 356/28 |
| 2012/0259448 | A1 | 10/2012 | Rzonca et al. |
| 2013/0108494 | A1* | 5/2013 | Varga .......... F04C 14/28 418/2 |
| 2013/0123975 | A1* | 5/2013 | Duckworth .......... B05C 11/10 700/236 |
| 2014/0014683 | A1 | 1/2014 | Owen et al. |
| 2014/0014686 | A1* | 1/2014 | Bacco .......... B05C 11/1044 222/63 |
| 2016/0008834 | A1* | 1/2016 | Brudevold .......... B05B 15/50 118/708 |
| 2017/0176237 | A1 | 6/2017 | Carbone, II et al. |

FOREIGN PATENT DOCUMENTS

| | | |
|---|---|---|
| CN | 101998887 A | 3/2011 |
| CN | 103537408 A | 1/2014 |
| DE | 29620763 U1 | 2/1997 |
| DE | 10141676 A1 | 6/2002 |
| DE | 102006049955 A1 | 9/2007 |
| DE | 102010053167 A1 | 6/2012 |
| DE | 102017006457 A1 | 7/2018 |
| EP | 0554725 B1 | 9/1999 |
| EP | 1591170 A2 | 11/2005 |
| EP | 2404679 A1 | 1/2012 |
| EP | 2587063 A2 | 5/2013 |
| EP | 2684614 A1 | 1/2014 |
| EP | 2684615 A1 | 1/2014 |
| EP | 2965823 A1 | 1/2016 |
| JP | 08-285654 A | 11/1996 |
| JP | 09-075819 A | 3/1997 |
| JP | 2009-542430 A | 12/2009 |
| JP | 2013-096415 A | 5/2013 |
| JP | 2013-538672 A | 10/2013 |
| JP | 2014-018798 A | 2/2014 |
| WO | 2011/084727 A2 | 7/2011 |
| WO | 2016/007639 A1 | 1/2016 |
| WO | 2016/010597 A1 | 1/2016 |

OTHER PUBLICATIONS

"Nordson TruFlow Meter Concert Controller Variation Management"; published Oct. 2013; https://www.youtube.com/watch?v=I3vt4jdCsR8; YouTube, LLC; 2019; accessed Apr. 22, 2019; 3 pages.

(IPEA/409) International Preliminary Report on Patentability Chapter II or (IB/373) International Preliminary Report on Patentability Chapter I Mailed on Oct. 18, 2018 for WO Application No. PCT/US17/025309.

International Patent Application No. PCT/US2017/025309: Invitation to Pay Additional Fees dated Jun. 28, 2017, 15 pages.

Nordson Adhesive Systems: "Nordson TruFlow Meter Concert Controller Variation Management", Oct. 23, 2013, p. 1, XP054977433, Retrieved from the internet: URL:https://www.youtube.com/watch?, retrieved on Jun. 16, 2017.

TruFlow™ Meter, Jun. 6, 2013, 2 pages, http://www.nordson.com/--/media/files/Nordson/adhesive-dispensing-systems/Products/Remote-metering-systems/TruFlow-Meter.pdf.

"Nordson TruFlow Meter Concert Controller Variation Management"; published Oct. 2013; https://www.youtube.com/watch?v=I3vt4jdCsR8; YouTube, LLC; 2019; accessed Apr. 22, 2019; 10 pages.

"Nordson VersaBlue Plus Melter Integrated Flow Control"; https://www.youtube.com/watch?v=ndjap09cG08; YouTube, LLC; 2019; accessed Feb. 23, 2024; 12 pages.

"Third party objections to the patent in dispute EP3315211", Nov. 2, 2019, 12 pages (Contains English Machine Translation).

Observations by third parties Mailed on Jan. 13, 2023 for EP Application No. 17199138.3, p. 8.

* cited by examiner

SYSTEM AND METHOD FOR MONITORING LIQUID ADHESIVE FLOW

CROSS-REFERENCE TO RELATED APPLICATION

This application is a continuation of U.S. patent application Ser. No. 15/475,442, filed Mar. 31, 2017, which claims the benefit of U.S. Provisional Patent App. No. 62/318,114, filed Apr. 4, 2016, the entire disclosures of both of which are hereby incorporated by reference as if set forth in their entirety herein.

TECHNICAL FIELD

The present disclosure relates generally to hot melt adhesive systems, and more particularly to an adhesive tracking system configured to monitor the amount of hot melt adhesive or other flowable liquid material dispensed from a hot melt adhesive system.

BACKGROUND

Dispensing systems that dispense thermoplastic hot melt adhesive or other flowable material are widely used in the manufacturing and packaging industries. For example, hot melt adhesive may be used for carton sealing, case sealing, tray forming, pallet stabilization, and non-woven applications, among others. Typically, hot melt adhesive is contained in or provided from an adhesive supply, such as a tank or hopper of an adhesive melter. The hot melt adhesive is accordingly heated, melted, and pumped to a dispenser, such as a dispensing applicator or other applicator which applies the hot melt adhesive to a product or substrate.

Manifolds are typically used to direct liquid hot melt adhesive into plural flow streams for output through hoses to the dispensers. Different types of pumps, such as piston pumps, drive liquid hot melt adhesive through the hot melt adhesive system, including the manifolds. Metering systems can monitor the flow of hot melt adhesive in hot melt adhesive dispensing systems. Conventional metering systems are typically in fluid communication with each respective discharge outlet of the dispensing system so that the flow of liquid material through each outlet can be independently monitored. This arrangement is suited for low-flow dispense rates and ensures that any restriction of flow through one liquid discharge outlet does not affect the flow of liquid from the remaining liquid discharge outlets.

However, the cost of installing an individual flow meter on each liquid discharge outlet is not economically practical, especially for dispensing systems which may include four to six applicators. Moreover, multiple flow meters require greater maintenance costs due to their many component parts. Additionally, conventional metering systems are not retrofittable on existing dispensing systems.

Thus, there exists a need for a metering system for use with a hot melt adhesive dispensing unit that addresses these shortcomings by, for example, providing a single flow meter in direct fluid communication with the manifold of a hot melt adhesive system for monitoring the amount of adhesive dispensed on every product.

SUMMARY

In one implementation, an adhesive tracking system for monitoring an output of hot melt adhesive is disclosed. The adhesive tracking system includes a flow meter having a flow inlet and a flow outlet, where the flow meter is configured to measure an amount of the adhesive flowing out of the flow outlet. The adhesive tracking system further includes a manifold configured to output adhesive, where the manifold is in fluid communication with the flow meter. The adhesive tracking system also includes at least one product detector configured to sense a presence of a product to which the adhesive is applied, and a controller in communication with the flow meter and the at least one product detector. The controller has a processor configured to determine a start time and an end time for application of the adhesive to the product, receive the amount of the adhesive flowing out of the flow outlet of the flow meter from the start time to the end time, and associate the amount of the adhesive with the product.

In another implementation, a method for monitoring hot melt adhesive flow is disclosed. The method includes detecting a presence of a product to which the adhesive is applied by using at least one product detector, determining a start time and an end time for applying the adhesive to the product, determining an amount of the adhesive applied to the product from the start time to the end time by measuring an amount of the adhesive dispensed from a manifold using a flow meter in fluid communication with the manifold, and associating the amount of the adhesive with the product.

In another implementation, a flow meter is disclosed for use in a hot melt adhesive system including an adhesive supply, a manifold, a heater, and at least one hose connected to a dispensing applicator. The flow meter includes a housing body having a hollow central recess, a flow inlet passage configured to receive hot melt adhesive from the manifold, and a flow outlet passage configured to discharge hot melt adhesive back into the manifold. The flow meter also includes a housing cover removably attached to the housing body and having a flat inner surface proximal to the hollow central recess of the housing body. The flow meter further includes a pair of rotatable gears provided in the hollow central recess and rotatably secured between the housing body and the housing cover, and at least one sensor configured to measure an amount of hot melt adhesive flowing through the flow meter.

In another implementation, a hot melt adhesive system includes an adhesive supply holding solid or semi-solid hot melt adhesive, a heater associated with the adhesive supply for melting the solid or semi-solid hot melt adhesive into a liquid hot melt adhesive, a first manifold in fluid communication with the adhesive supply, a pump for pumping the liquid hot melt adhesive from the heater into the first manifold, an air pressure regulator for regulating the flow of air into the pump from an air supply, at least one adhesive applicator configured to apply the liquid hot melt adhesive to a substrate, and an adhesive tracking system for monitoring an output of the liquid hot melt adhesive.

DETAILED DESCRIPTION

Figure 1:
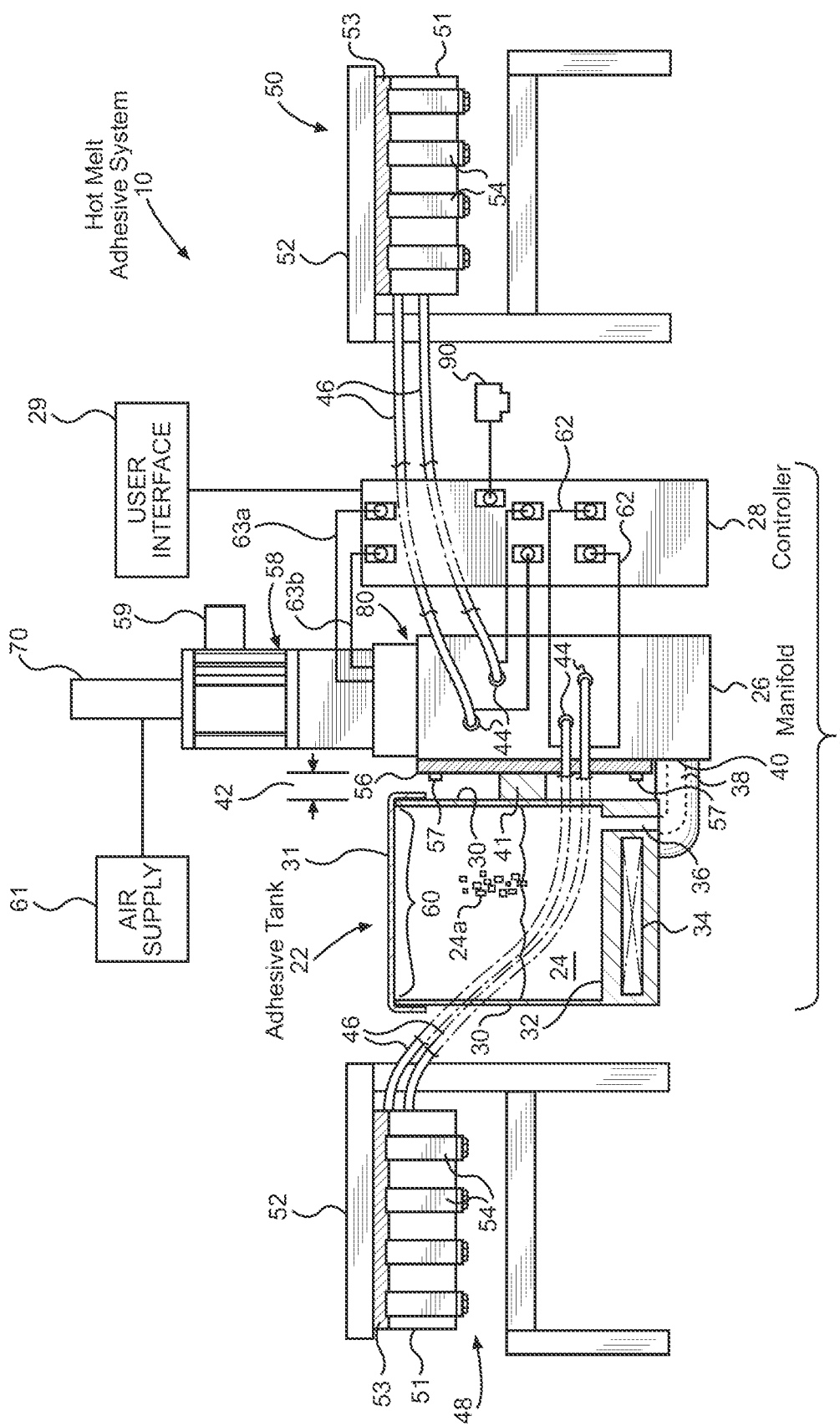
FIG. 1 is a schematic drawing of a hot melt adhesive system.

As shown in FIG. 1, a hot melt adhesive system 10 comprises a dispensing unit 20 that includes an adhesive supply 22 for receiving and melting solid or semi-solid hot melt adhesive 24a, such as pellets, a manifold 26 connected to the adhesive supply 22, a controller 28, and a user interface 29. The adhesive supply 22 may be a tank-style melter, or a grid and reservoir melter, among others. Upon melting, the solid or semi-solid hot melt adhesive 24a stored in the adhesive supply 22 transforms into a liquid hot melt adhesive 24. The adhesive supply 22 comprises side walls 30, a removable cover 31, and base 32 which includes one or more adhesive supply heaters 34 for melting and heating the hot melt adhesive 24a and the liquid hot melt adhesive 24 in the adhesive supply 22. An adhesive supply outlet 36 proximate the base 32 is coupled to a passage 38 which connects to an inlet 40 of the manifold 26.

Figure 2A:
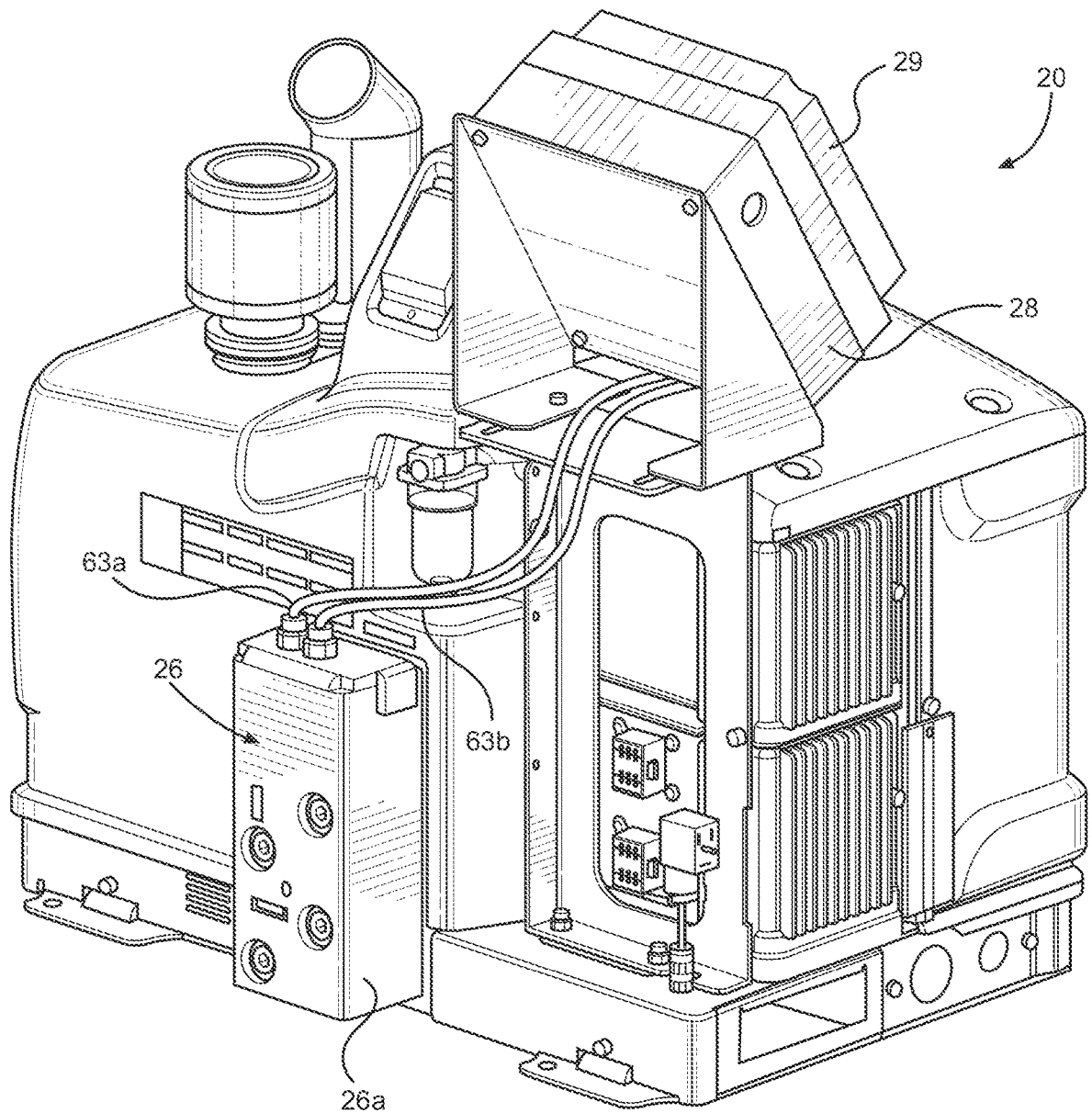
FIG. 2A is a rear perspective view of a dispensing unit of the hot melt adhesive system of FIG. 1 and an adhesive tracking system.
Figure 2B:
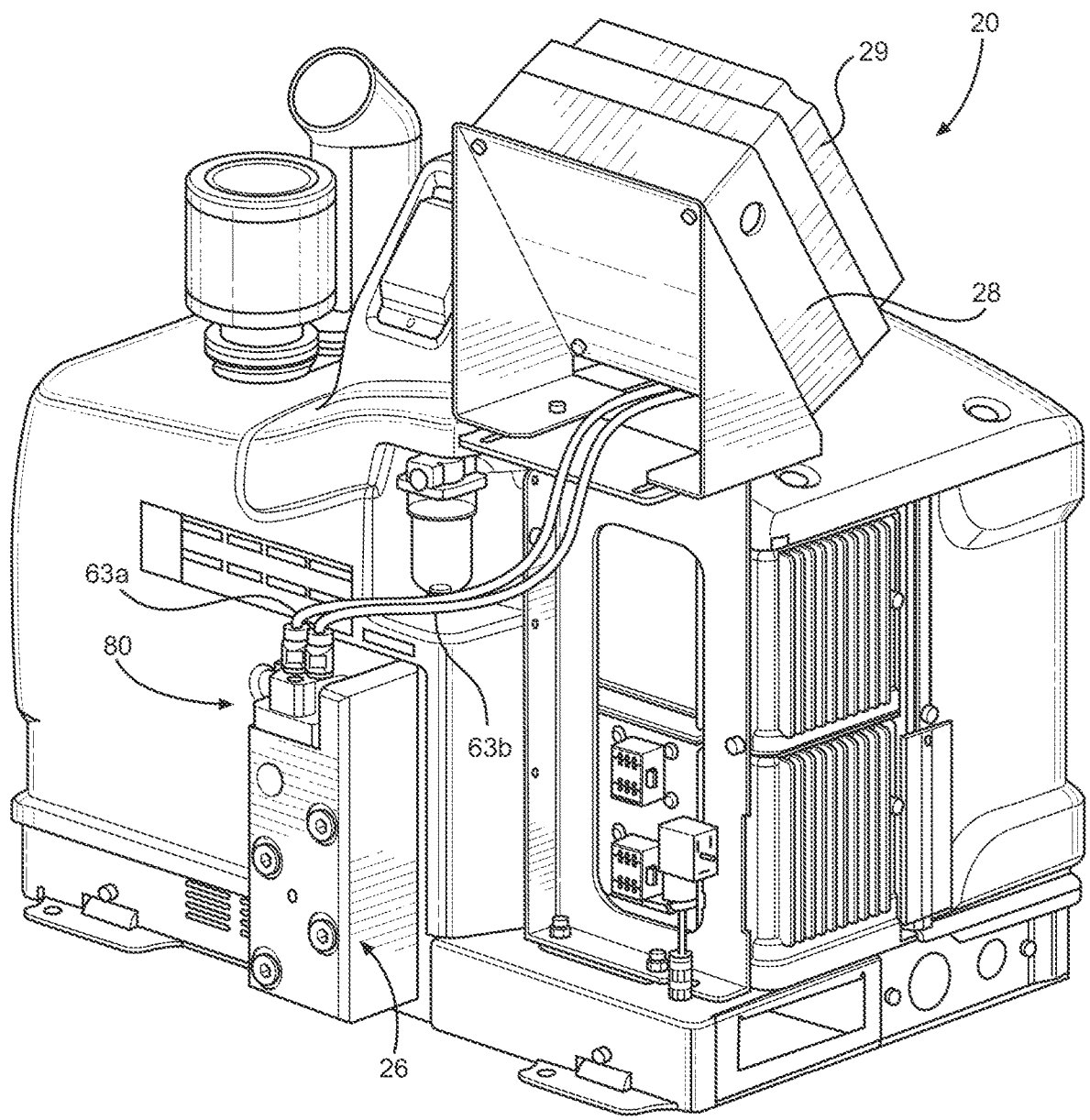
FIG. 2B is a rear perspective view of the dispensing unit of the hot melt adhesive system of FIG. 1 and a flow meter of the adhesive tracking system.
Figure 13:
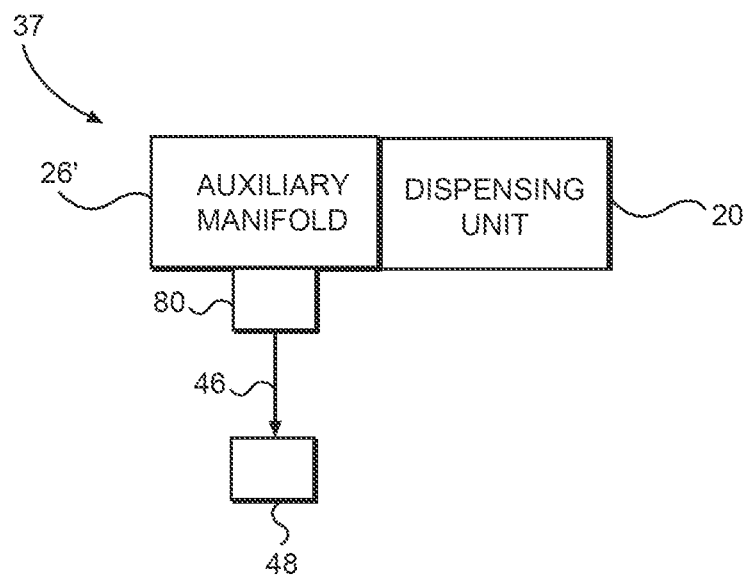
FIG. 13 is a schematic illustration of the dispensing unit of FIG. 1 and an adhesive tracking system that includes an auxiliary manifold mounted directly to the dispensing unit.
Figure 14:
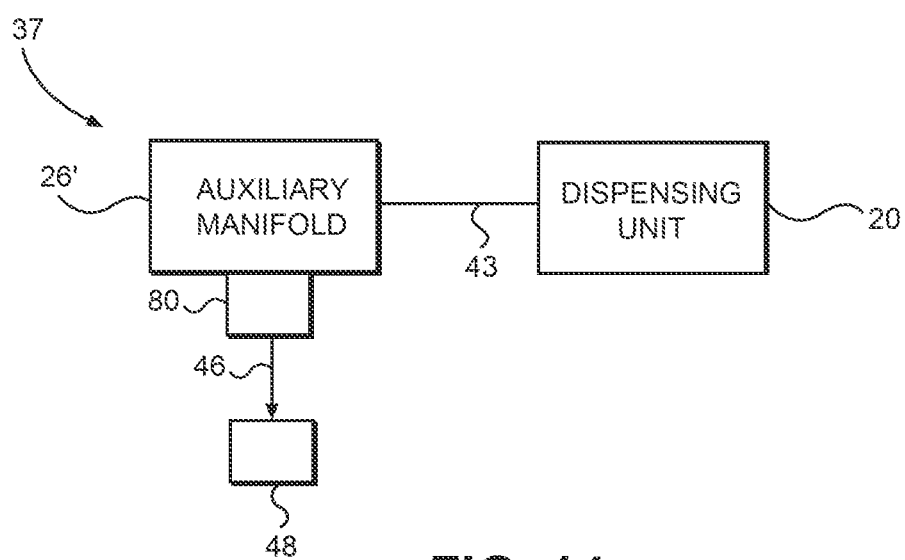
FIG. 14 is a schematic illustration of the dispensing unit of FIG. 1 and an adhesive tracking system that includes an auxiliary manifold mounted remotely to the dispensing unit.

The manifold 26 may be integrated directly into the dispensing unit 20 of the hot melt adhesive system 10, such that the manifold 26 is mounted to a side wall 30 of the adhesive supply 22. A dispensing unit 20 having such an integral manifold 26 is illustrated in FIGS. 2A and 2B. In other implementations, an auxiliary manifold may be retrofitted to other hot melt adhesive systems by directly or indirectly mounting to the dispensing unit 20, as schematically shown in FIG. 13 and as will be discussed in further detail below. As shown schematically in FIGS. 13 and 14, an auxiliary manifold 26' of the adhesive tracking system 37 may be in fluid communication with the dispensing unit 20 and in fluid communication with at least one adhesive applicator 48 via at least one hose 46 and a flow meter 80 fitted to an end of the at least one hose 46 proximal the at least one adhesive applicator 48. The auxiliary manifold 26' may be directly mounted to the dispensing unit 20, as schematically shown in FIG. 13, or remotely mounted to the dispensing unit 20 via at least one transfer hose 43, as schematically shown in FIG. 14.

Referring again to FIG. 1, a positive-displacement pump 58, such as a vertically-oriented piston pump (as shown) or a gear pump, is coupled to the manifold 26 for pumping liquid hot melt adhesive 24 from the adhesive supply 22 into the manifold 26, where it is split into separate flows, A pump motor 59 drives the pump 58. The manifold 26 is mounted to a side wall 30 of the adhesive supply 22 with a spacer 41 and is spaced from the adhesive supply 22 a distance 42 sufficient to provide thermal isolation of the adhesive supply 22 from the manifold 26. The manifold 26 includes a plurality of outlet ports 44 which may be fitted with heated hoses 46 attached to one or more adhesive applicators 48, 50 to supply the liquid adhesive 24 to the applicators 48, 50. While FIG. 1 shows the adhesive supply 22 in close physical proximity to the manifold 26, other arrangements are also possible where the source of hot melt adhesive is physically distant from the manifold. In such arrangements, more than one pump may be used to move hot melt adhesive from the adhesive supply 22 toward the ultimate point of application.

Figure 3:
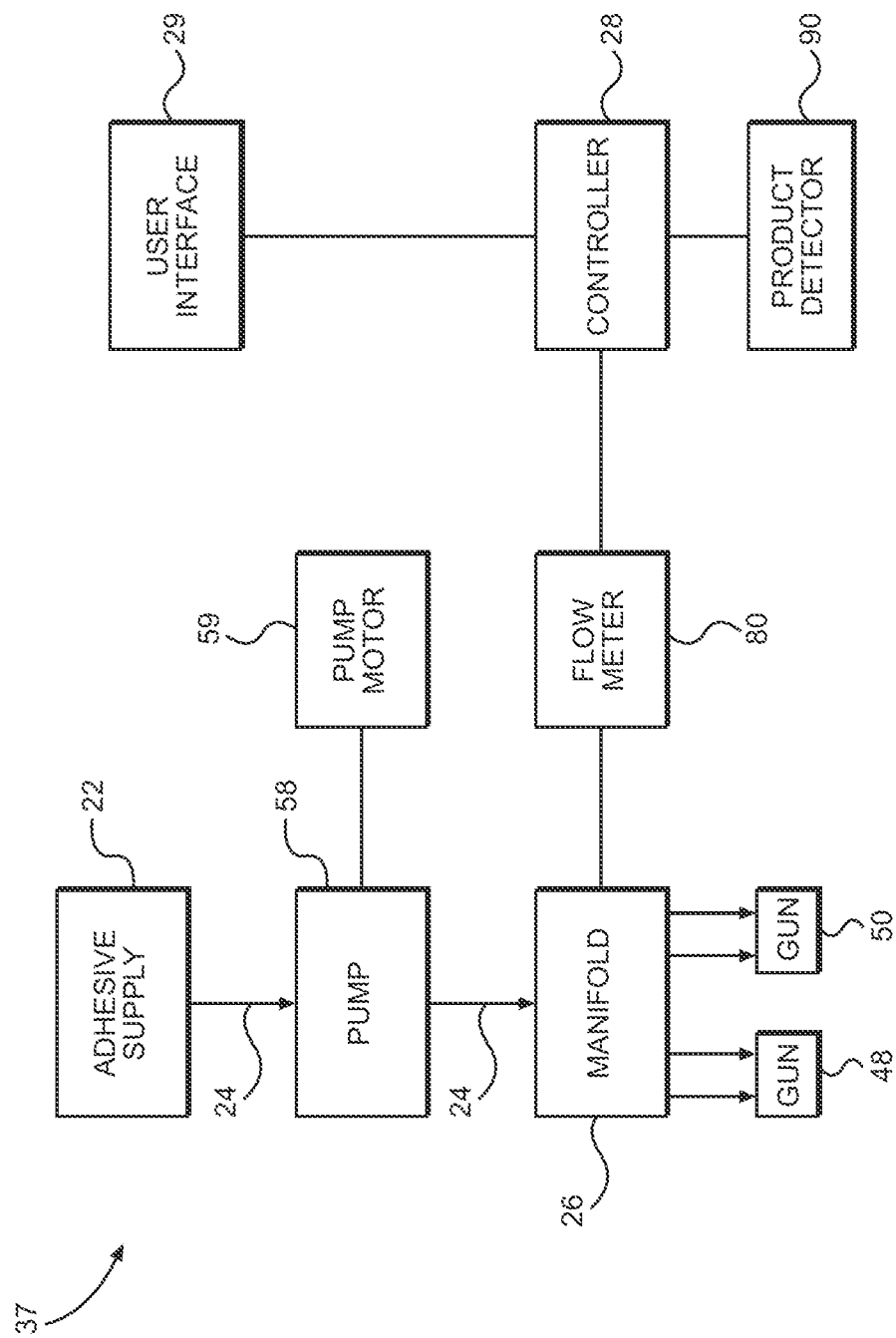
FIG. 3 is a schematic diagram of the adhesive tracking system.
Figure 4:
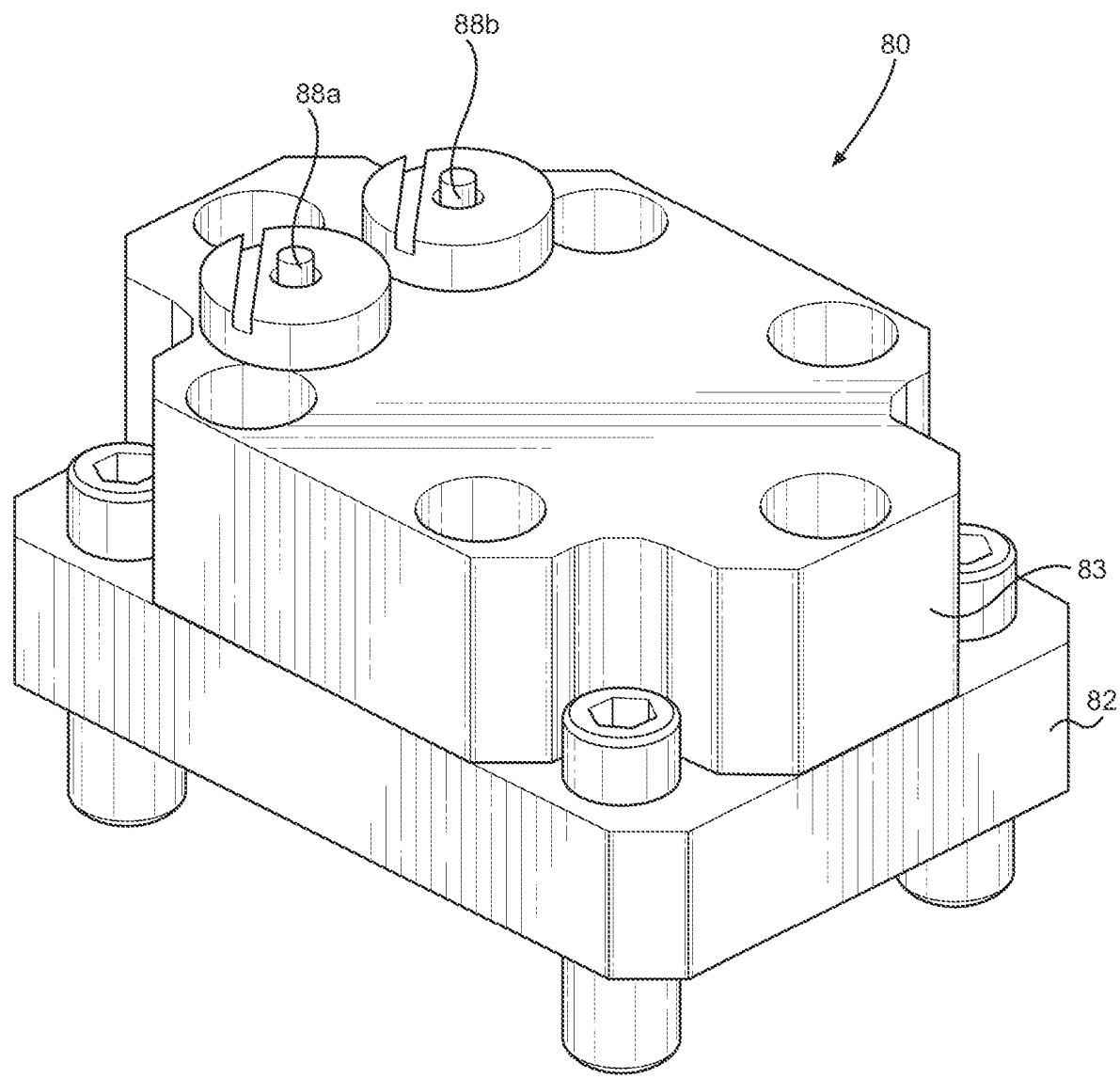
FIG. 4 is top perspective view of the flow meter.
Figure 5:
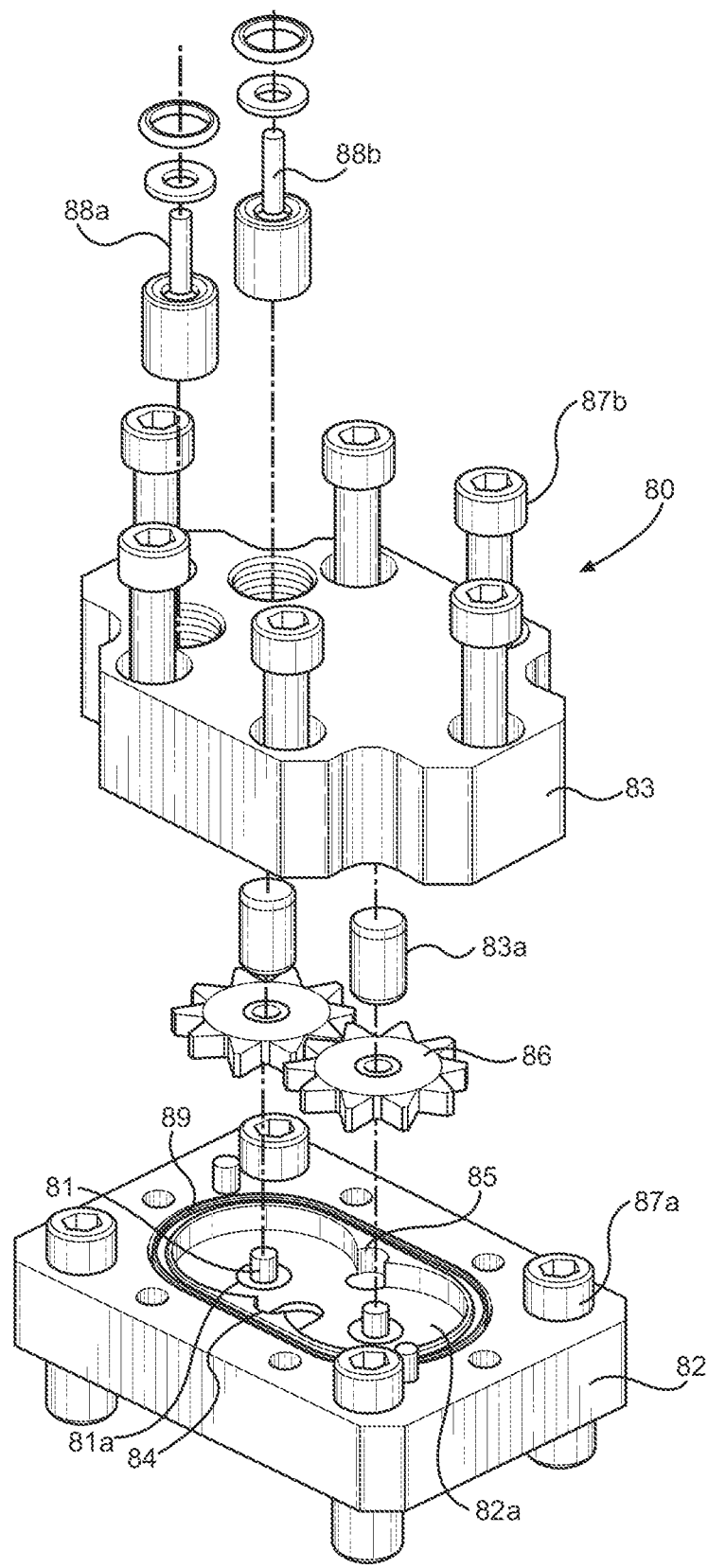
FIG. 5 is a top exploded perspective view of the flow meter.
Figure 6:
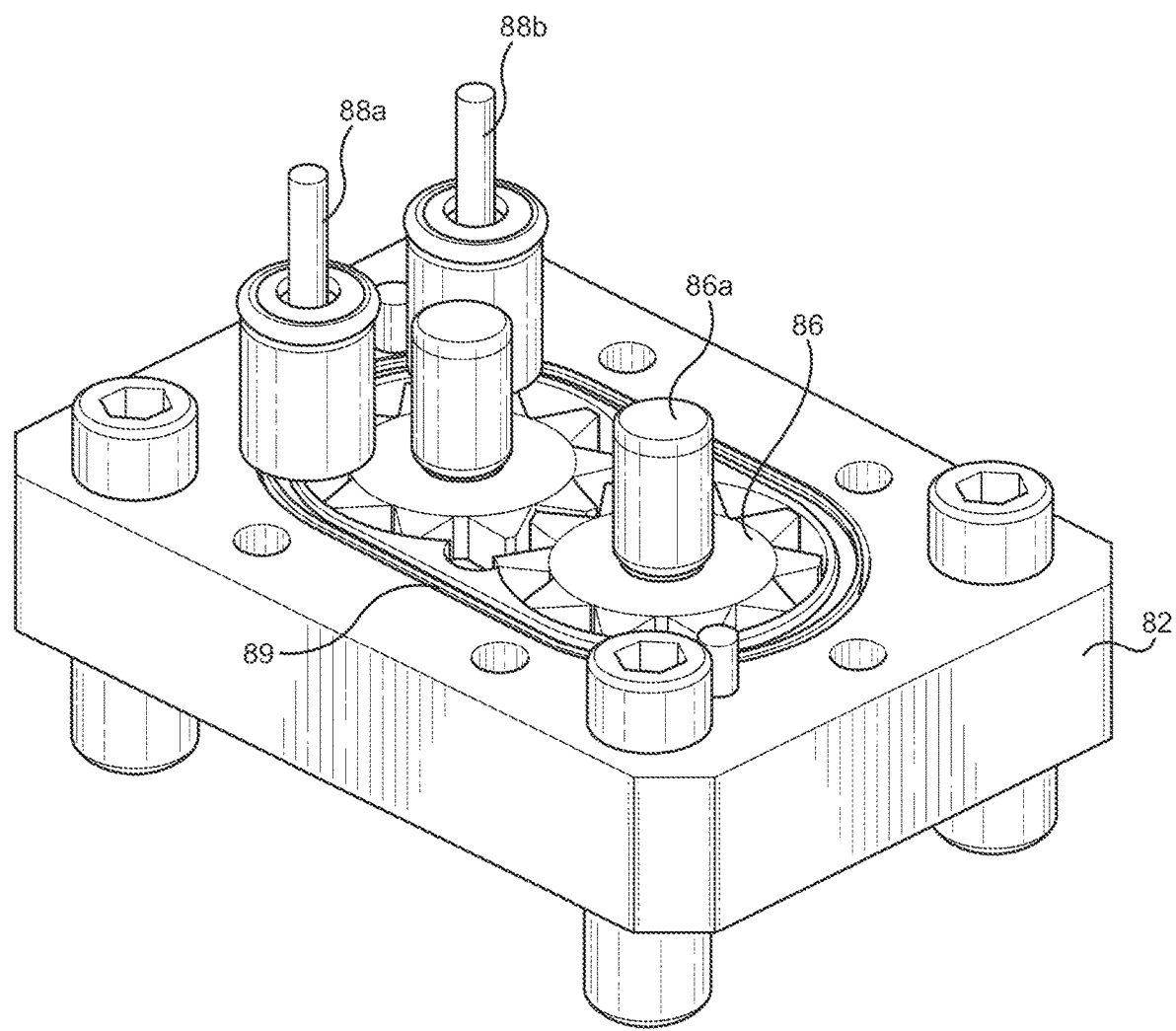
FIG. 6 is a perspective view of a bottom portion of the flow meter.

As schematically shown in FIG. 3, the manifold 26 may create a plurality of flow streams that are carried by the corresponding heated hoses 46 to the applicators 48, 50. The applicators 48, 50 include one or more adhesive dispensing modules 54 configured to dispense/apply the liquid hot melt adhesive 24 to a product, such as a carton, package, or other object. The adhesive dispensing modules 54 are mounted to applicator bodies 51 having applicator heaters 53 and are supported on a frame 52. The hot melt adhesive system 10 includes two applicators 48, 50, with one applicator located on each side of the dispensing unit 20 as shown in FIG. 1, although other implementations of the adhesive system 10 may use a different number of applicators, dispensing modules, and other configurations.

Also shown in FIG. 1, the manifold 26 is located adjacent the adhesive supply 22, between the adhesive supply 22 and the controller 28. It will be appreciated that other configurations in which the manifold 26 is centrally located on unit 20 may be utilized as well. The outlet ports 44 on the manifold 26 are arranged substantially in the center of the dispensing unit 20 so that the distances from a given outlet port 44 to either the tank-side or the controller-side of the unit 20 are substantially the same. This centralized arrangement of outlet ports 44 permits the same length of hose 46 to be utilized to supply liquid adhesive 24 to dispensing applicators 48, 50 located on either side of the dispensing unit 20. The manifold 26 may include a manifold heater 56 which is separate from the adhesive supply heater 34 and which can be independently controlled by the controller 28. It will be appreciated that a single heater can be used for heating the adhesive supply 22 and the manifold 26.

Dispensing unit 20 includes a controller 28 which houses the power supply and electronic controls for the dispensing unit 20. The hoses 46 are electrically coupled to the controller 28 by cord sets 62 associated with each hose 46. The controller 28 independently monitors and adjusts the adhesive supply heater 34, the manifold heater 56, the hoses 46, and the applicator heaters 53 to melt solid or semi-solid adhesive 24a received in the adhesive supply 22 and to maintain the temperature of liquid adhesive 24 to ensure proper viscosity of the adhesive 24 supplied to the applicators 48, 50 and dispensed by the adhesive dispensing modules 54.

With respect to the heating features of the hot melt adhesive system 10, the controller 28 is electrically coupled to the heaters, including the adhesive supply heater 34, the manifold heater 56, and the applicator heaters 53, as well as any hose heaters. The controller 28 may also be coupled with various temperature sensors in the hot melt adhesive system 10, which may be associated with or included in the adhesive supply heater 34, the manifold heater 56, the applicator heaters 53, and any hose heaters. The controller 28 independently monitors and adjusts the adhesive supply heater 34, the manifold heater 56, the applicator heaters 53, and any hose heaters, to melt solid or semi-solid hot melt adhesive 24*a* received in the adhesive supply 22 and to maintain the temperature of (melted) liquid hot melt adhesive 24 to ensure proper viscosity of the liquid hot melt adhesive 24 supplied to the applicators 48, 50 and dispensed by the adhesive dispensing modules 54. For instance, the controller 28 receives temperature information from temperature sensors and sends heater control instructions to each heater to adjust the temperature. Such heater control instructions may increase or decrease the temperature of any or all of the heaters in the hot melt adhesive system 10.

The pump 58 is located external to the adhesive supply 22 and is connected to an air pressure regulator 70 that receives air from an air supply 61. More particularly, the air pressure regulator 70 is mounted to the dispensing unit 20 and connects to the air supply 61. In some implementations, the pump 58 may be attached to the manifold 26 and heated by the manifold heater 56. This arrangement permits a larger tank opening 60, increases the tank capacity, and reduces the time required to heat the pump 58. Further, a flow meter 80 may be attached to the manifold 26. The flow meter 80 comprises a pair of sensors that are electrically coupled to the controller 28 by respective cords 63*a*, 63*b* associated with each sensor. At least one product detector 90, such as a photo-sensor, is also electrically coupled to the controller 28.

The manifold 26, the flow meter 80, the product detector 90, the controller 28, and the user interface 29 are components an adhesive tracking system 37 for monitoring adhesive applied to a product or substrate, including the total amount of adhesive dispensed and the average amount of adhesive dispensed per product, in order to provide useful system data and alarms to a user during operation. Referring again to FIG. 3, additional features relating to the adhesive tracking system 37 and its control are disclosed. The pump 58 advances liquid hot melt adhesive 24 from the adhesive supply 22 to the manifold 26, where it is split into a plurality of flow streams. The manifold 26 includes a flow meter 80 for measuring the flow rate of the liquid hot melt adhesive 24 therethrough. In other implementations, the flow meter 80 may be fitted to an end of the hose 46. The flow meter 80 collects flow rate information using at least one flow rate sensor 88 in electrical communication with the controller 28 and user interface 29 in order to provide feedback to the user. In some implementations, a pair of flow rate sensors 88*a*, 88*b* are provided which supply a quadrature output. The reason for this is that during the piston pump stroke, the material actually flows backwards, and thus the quadrature output allows this backwards flow to be subtracted from the forward flow in order to maintain a high level of accuracy. A single sensor would be sufficient in implementations using a gear pump in which there is no backwards flow.

The user interface 29 is associated with the controller 28 and provides a user with information about the heating functions of the hot melt adhesive system 10. For example, the user interface 29 presents information relating to adhesive temperature, heater temperature, and the like. The user interface 29 also includes controls for adjusting heating-related parameters of the hot melt adhesive system 10. Additionally, the user interface 29 and controller 28 also provides a user with information about the adhesive tracking system 37, as discussed in greater detail below.

Turning again to FIGS. 2A and 2B, the dispensing unit 20 of the hot melt adhesive system is illustrated, and includes the manifold 26, the controller 28, and the user interface 29. In FIG. 2A, the manifold 26 is shown having an insulated jacket 26*a* that protects a user from getting burned when the manifold is heated. In FIG. 2B, the manifold 26 is shown without the cover 26*a*, revealing the flow meter 80 in fluid communication with the manifold 26.

The adhesive tracking system 37 uses the flow meter 80 to directly measure adhesive output. In some implementations, the flow meter 80 can be removably connected to the manifold 26. With reference to FIGS. 4-7, for instance, the flow meter 80 comprises a housing body 82 having a flow inlet passage 84 configured to receive hot melt adhesive from the manifold 26, and a flow outlet passage 85 configured to discharge hot melt adhesive back into the manifold 26. The housing body 82 of the flow meter 80 can be removably connected to the manifold 26 via fasteners 87*a*, such as screws or bolts. The flow meter 80 further includes a housing cover 83 that is removably connected to the housing body 82 by a plurality of fasteners 87*b*, such as screws or bolts. In another implementation, the flow meter 80 can be integrated with the manifold 26. For instance, housing body 82 may be integrated with the manifold 26 such that the housing cover 83 can removably connect thereto via fasteners 87*b*. In another implementation, individual components of the flow meter 80, such as gears 86, pins 81, and bushings 81*a*, which will be described in detail below, may be incorporated into the housing cover 83 so that the housing cover 83 can removably connect directly to the manifold 26 via fasteners 87*b*, such that the housing body 82 is not used. In yet another implementation, the individual components of the flow meter 80, such as gears 86, pins 81, and bushings 81*a*, may be integrated directly into the manifold 26 so that the housing cover 83 can removably connect directly thereto.

The flow meter 80 further comprises a pair of rotatable gears 86 and at least one sensor 88, such as a magnetic pick-up sensor, configured to measure an amount of the liquid adhesive flowing through the flow meter. A pair of sensors 88*a*, 88*b* are shown in the implementation of the flow meter 80 depicted in the figures. In particular, the pair of sensors 88*a*, 88*b* are configured to measure rotation of the rotatable drive gears 86 to determine an amount of the adhesive flowing out of the flow outlet 85. The flow outlet 85 is in fluid communication with the manifold 26 so that the liquid adhesive is sent back into the manifold 26 and then distributed to the various hoses 46 which are directly connected to the manifold 26. In some implementations, the flow outlet 85 can be connected directly to the hoses that are connected to the adhesive applicators.

The housing body 82 also comprises an elastomeric seal 89, such as an elongated or oval shaped O-ring, to maintain a watertight seal with the cover to prevent fluid leakage from the flow meter. Further, the plurality of fasteners 87*a*, 87*b* are also adapted to removably secure the flow meter 80 to the manifold 26. In other implementations, the flow meter 80 may be connected in fluid communication to the pump 58 or to any of the hoses 46.

The gears 86 are contained within a hollow central recess 82*a* of the housing body 82 so that they are free to rotate about an axis of rotation. In particular, the gears are rotatably secured between the housing body 82 and the housing cover 83. In one implementation, the gears 86 are a substantially linear series of intermeshing, flow-metering spur gears that are each configured to rotate about respective pins 81 provided in corresponding bushings 81*a* in the housing body 82. The spur gears 86 are positioned so that they are substantially coplanar, and so that each spur gear is parallel to and spaced from at least one neighboring spur gear. Further, the spur gears 86 are positioned so that an axis of rotation of each of the gears is positioned along a common central line. The spur gears 86 are also positioned so that the teeth of each spur gear intermesh with the teeth of the neighboring spur gear.

The flow inlet passage 84 provides a conduit between a liquid source in the manifold 26 and the inlet side of the intermeshing pair of gears 86. Similarly, flow outlet passage 85 provides a conduit between the discharge side of the intermeshing pair of gears 86 and the manifold 26. The gears 86 are in fluid communication with a flow inlet passage 84 that directs a pressurized stream of liquid into the recess 82*a* toward the inlet side of the intermeshing pair of gears. As a result, the pressurized liquid stream drives the gears 86 in tandem so that each of the gears rotate in an opposite direction relative to each other. For example, one of the gears rotates in a counterclockwise direction while its immediately neighboring gear rotates in a clockwise direction. Employing counter-rotating gears 86 creates a positive displacement for precise metering of liquid hot melt adhesive.

As a result of this rotation of the gears 86, after a stream of liquid is directed to the inlet side of the intermeshing portion of the gears via the flow inlet passage 84, the stream is divided in half by the two gears. This occurs because, as the gears rotate, liquid flows into the spaces between the teeth of each of the oppositely rotating intermeshing pair of gears. Thus, two liquid streams are respectively carried in opposite directions around the perimeter of the central recess 82*a* by the teeth of each oppositely rotating gear, such that the two liquid streams converge near the flow outlet passage 85. Accordingly, the volume of liquid flowing between the gears 86 and the perimeter wall of the central recess 82*a* represents the volume of liquid per pulse. As the respective gear teeth of each neighboring gear comes into mesh with each other, the liquid is displaced from the spaces between the gear teeth of each gear, which forces the liquid into and through the flow outlet passage 85 that is adjacent the intermeshing pair of gears. Thus, during this process, the pressurized liquid moving through the flow meter 80 exerts rotational forces on the gears 86, causing them to rotate at a particular rate. The sensors 88*a*, 88*b* are configured to measure this speed of rotation of the gears 86 in order to determine the flow rate of liquid moving through the flow meter 80. The gear-tooth flow meter 80 is configured to provide a resolution of, for example, approximately 25 mg.

Figure 7:
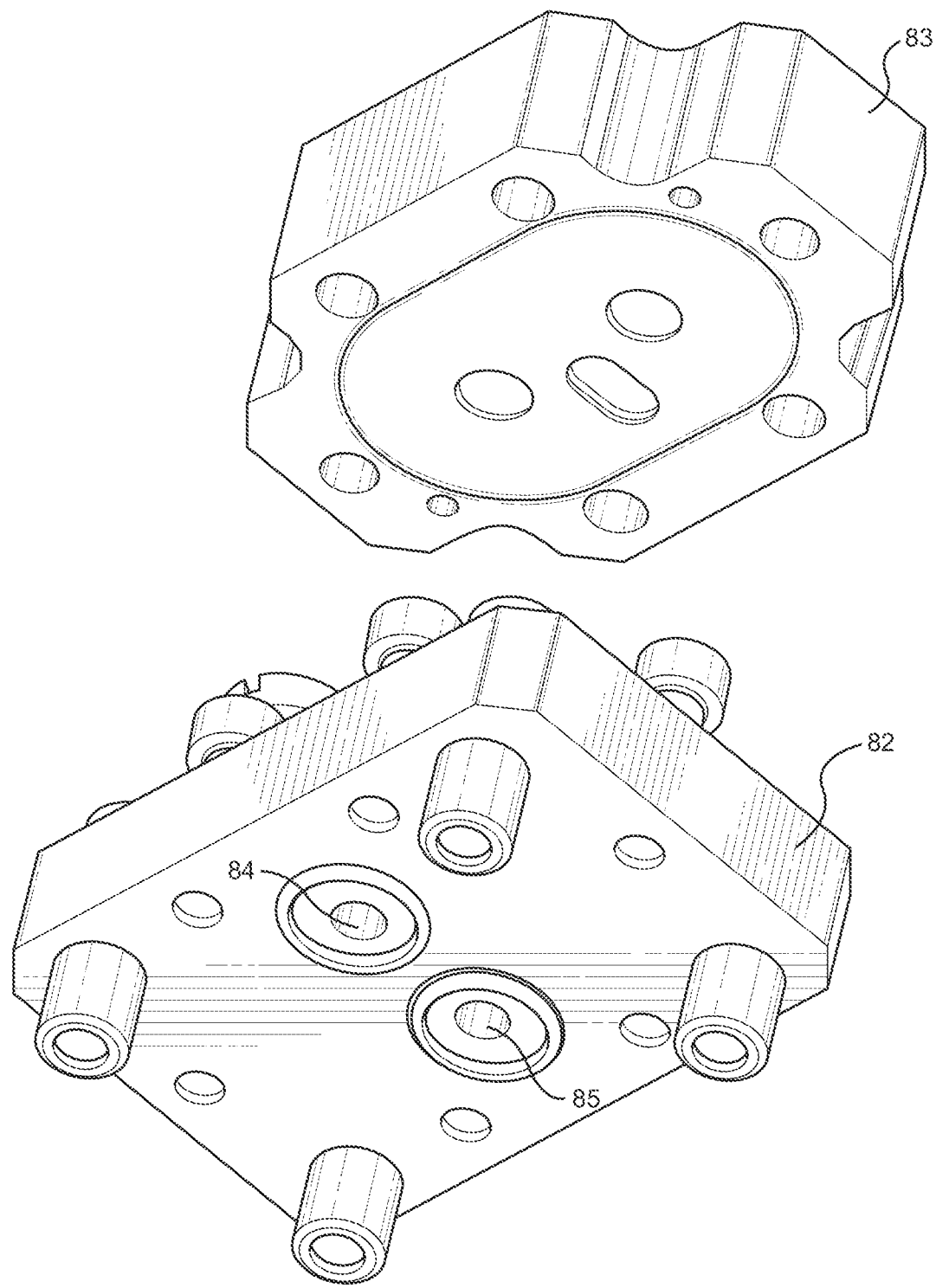
FIG. 7 is a bottom partially exploded perspective view of the flow meter.
Figure 8:
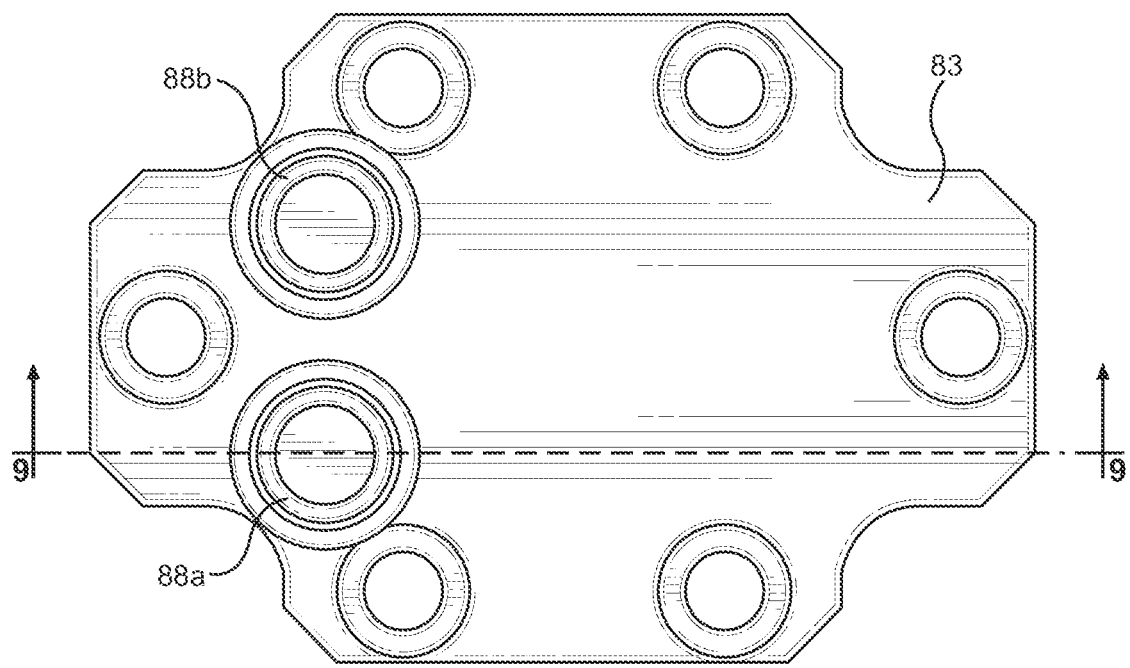
FIG. 8 is a top plan view of a bottom side of a housing cover of the flow meter.
Figure 9:
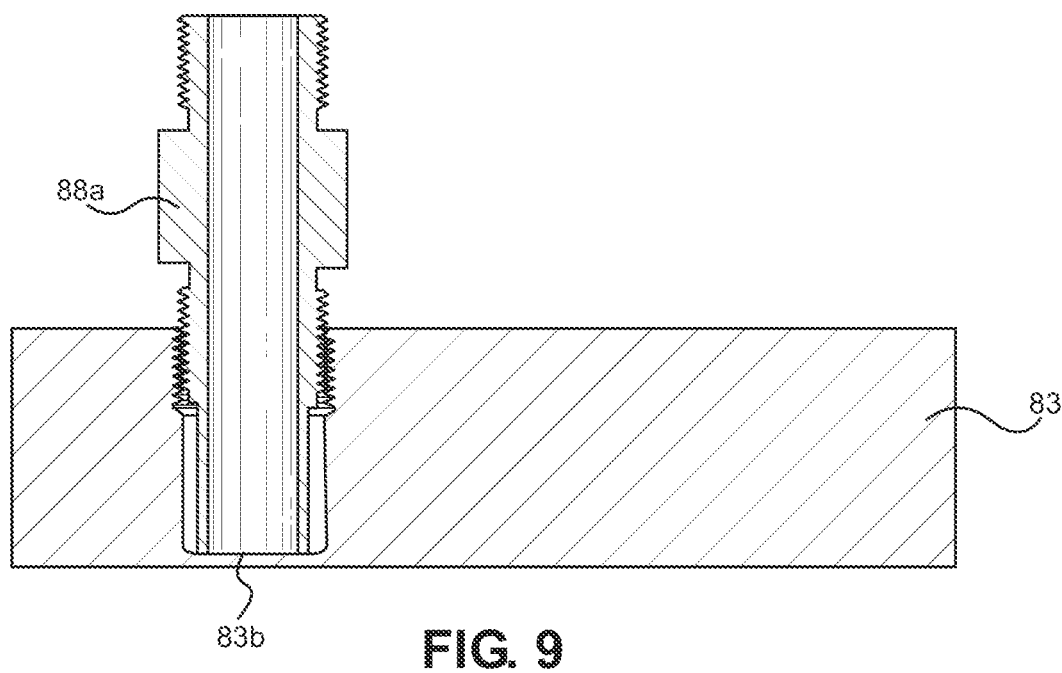
FIG. 9 is a cross-sectional view of the housing cover taken along line 9-9 of FIG. 8.

As shown in FIGS. 7-9, the gears 86 are bounded within the recess 82*a* by a flat inner surface of the housing cover 83. Each gear may further be bounded by a respective hardened support shaft 83*a* provided in the housing cover 83. A thin membrane 83*b* is provided underneath each sensor 88*a*, 88*b* on the flat inner surface of the housing cover 83, such that the thin membrane 83*b* is located between the sensors 88*a*, 88*b* and the gears 86.

Figure 10A:
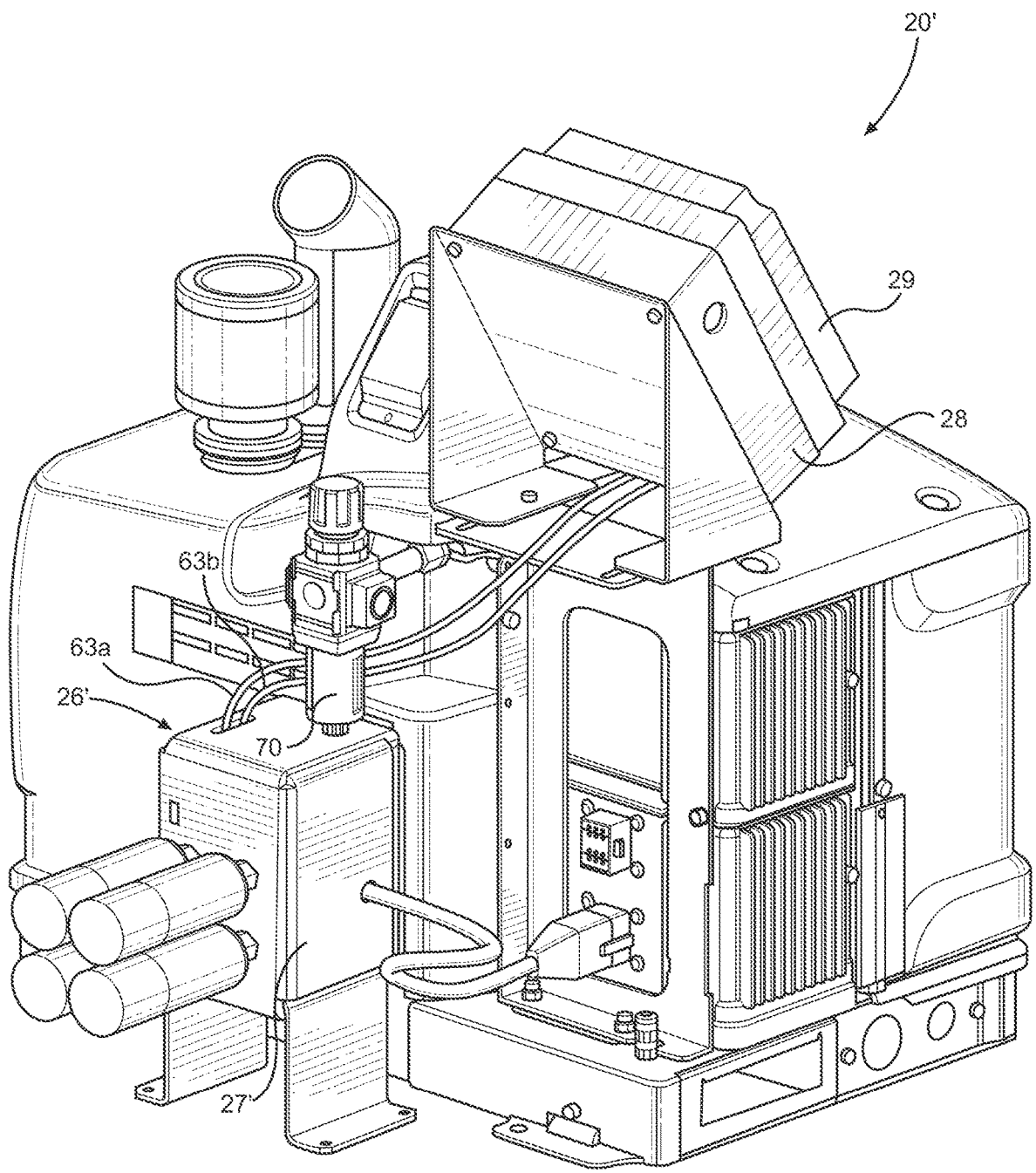
FIG. 10A is a rear perspective view of an implementation of an adhesive tracking system having an auxiliary manifold mounted directly to a dispensing unit.
Figure 10B:
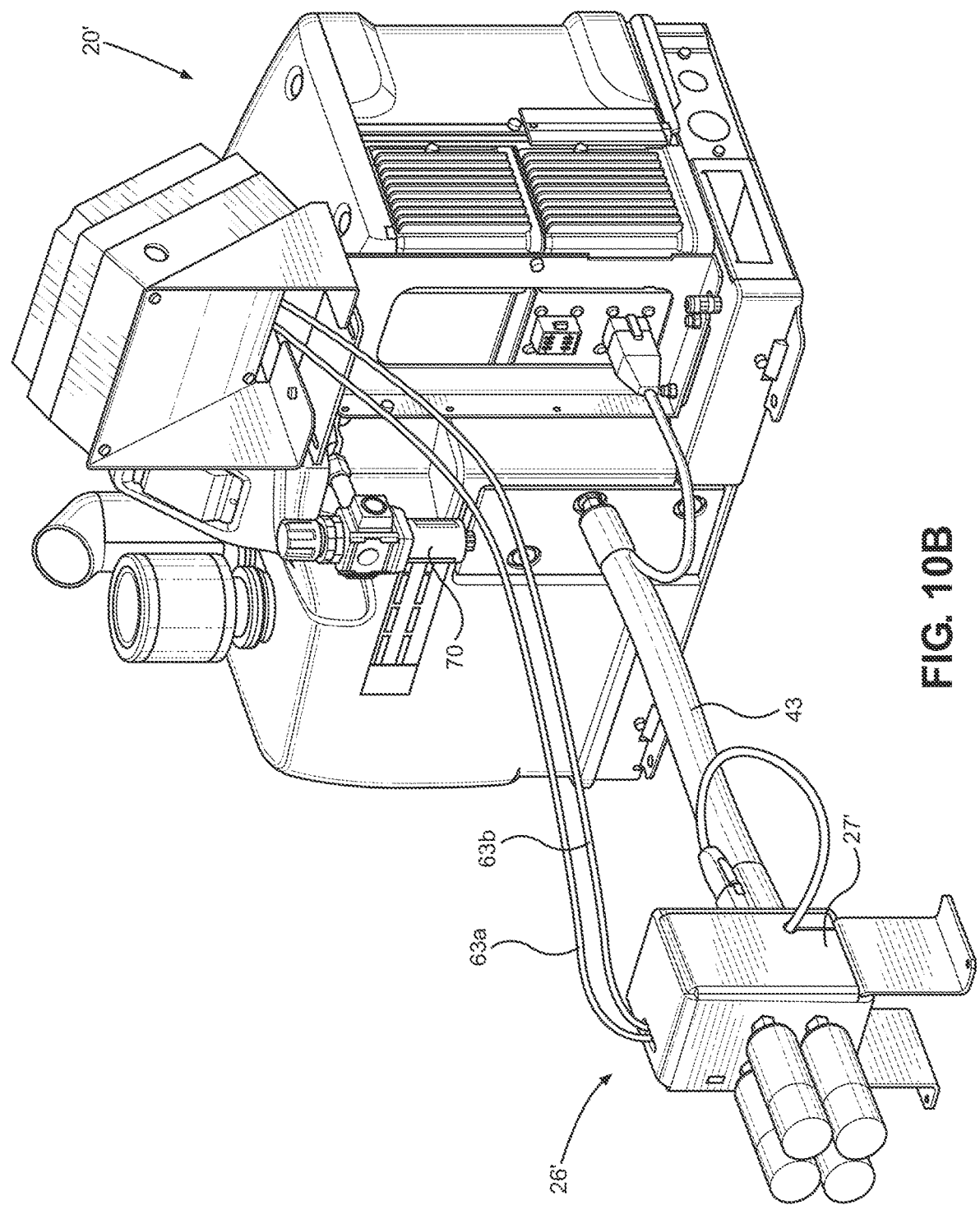
FIG. 10B is a rear perspective view of an implementation of an adhesive tracking system having an auxiliary manifold mounted remotely to a dispensing unit.
Figure 11A:
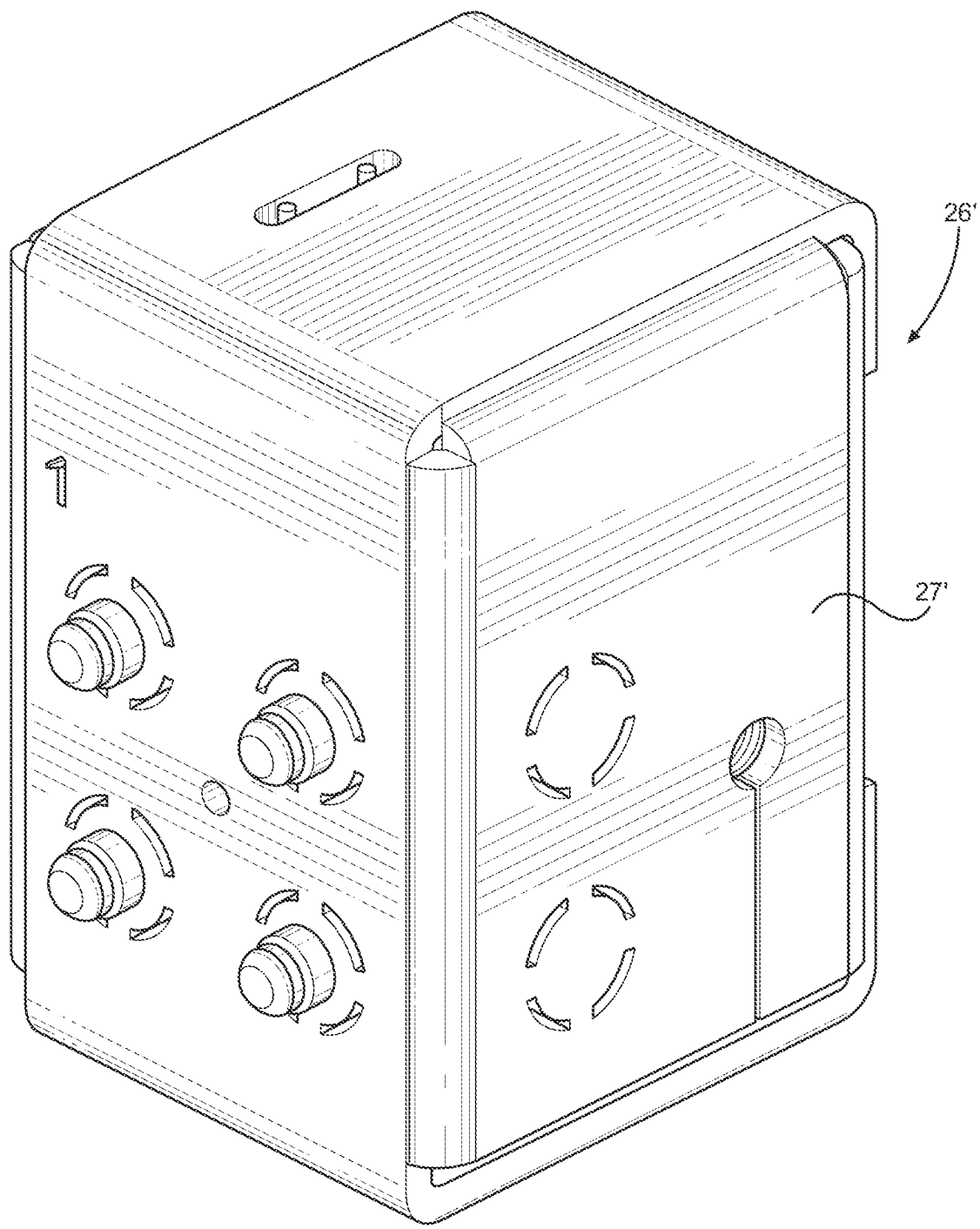
FIG. 11A is a perspective view of an auxiliary manifold.
Figure 11B:
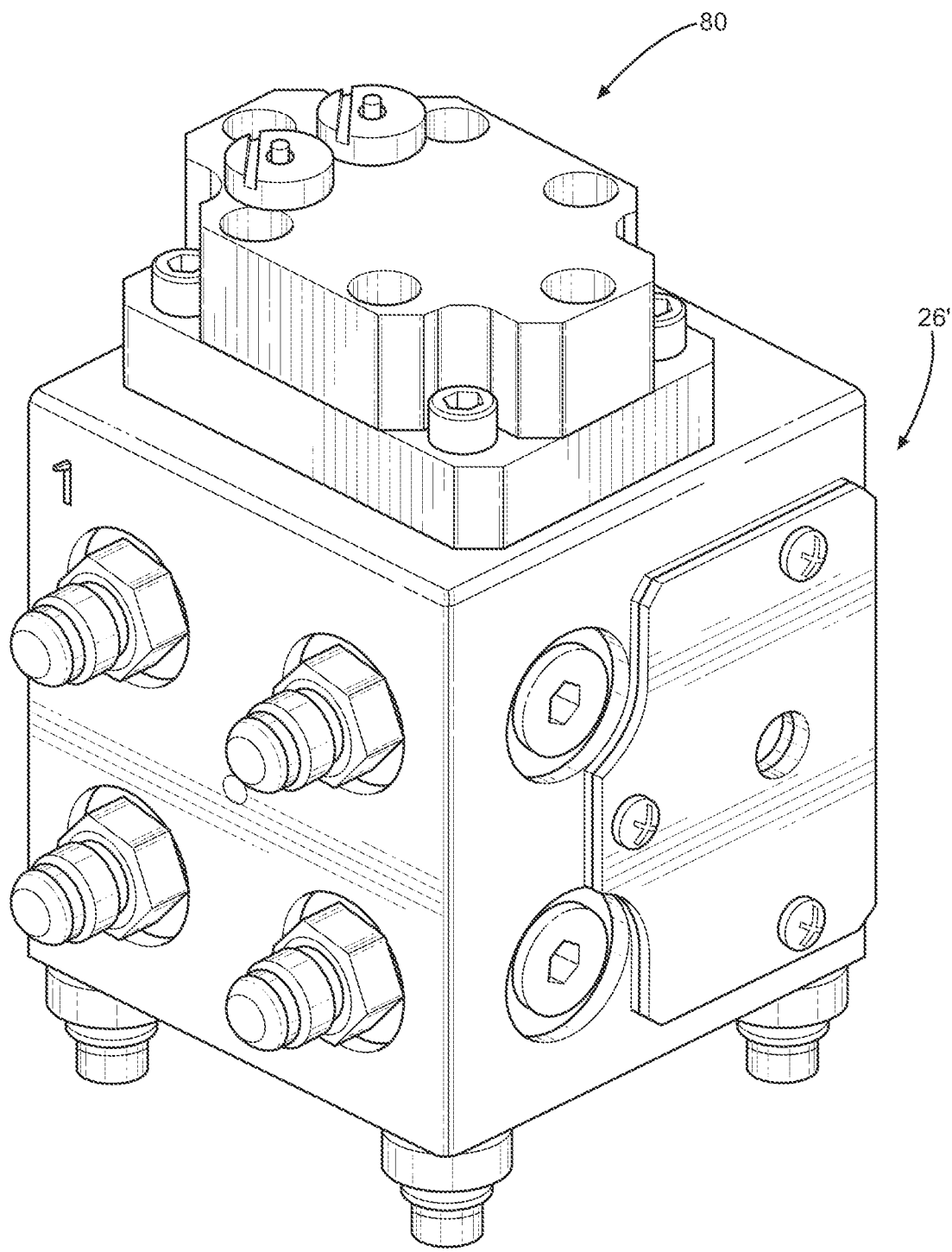
FIG. 11B is a perspective view of a flow meter connected to the auxiliary manifold of FIG. 11A.

In another implementation of a hot melt adhesive system, an accessory or auxiliary manifold 26' may be directly mounted to a dispensing unit 20', as shown in FIG. 10A, in order to retrofit existing hot melt adhesive systems with the adhesive tracking system 37. In another implementation, the accessory manifold 26' may be remotely mounted to the dispensing unit 20' via a transfer hose 43 as shown in FIG. 10B. It will be appreciated that the accessory manifold 26' may be retrofitted on hot melt adhesive systems that use either a piston style pump or a gear style pump. The flow meter 80 may be mounted to the accessory manifold 26' or integrated therein, so that hot melt adhesive that is received in the accessory manifold 26' can be directed through the flow meter 80. In some implementations, the accessory manifold 26' may include an internal heater. When the accessory manifold 26' is remotely mounted to the dispensing unit 20', the internal heater sources power from the transfer hose 43. When the accessory manifold 26' is directly mounted to the dispensing unit 20', the internal heater sources power from the dispensing unit 20' itself. As shown in FIG. 11A, the auxiliary manifold 26' includes an insulated jacket 27' that protects the flow meter 80 and also shields a user from being burned. As shown in FIG. 11B, the insulated jacket 27' is removed from the auxiliary manifold 26', thus illustrating an implementation of the auxiliary manifold 26' in which the flow meter 80 can be secured directly thereto.

Figure 12A:
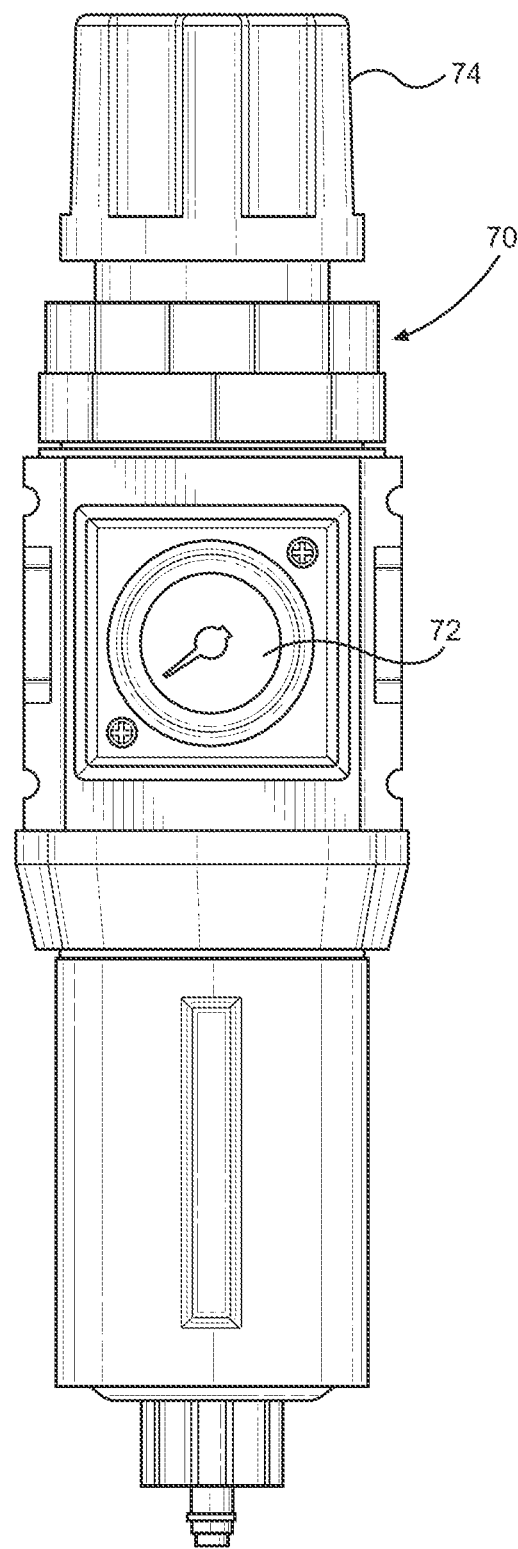
FIG. 12A is a front view of an air pressure regulator according to the present disclosure.
Figure 12B:
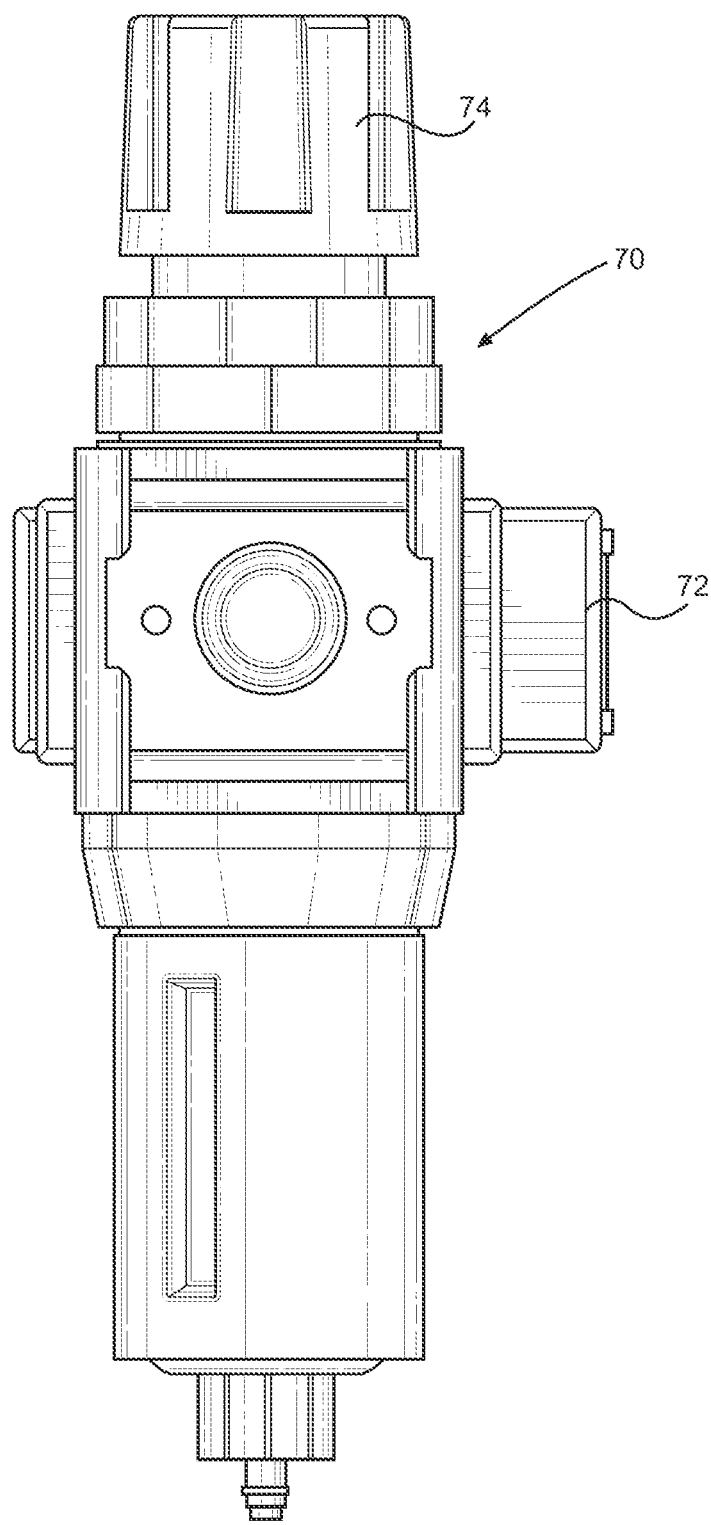
FIG. 12B is a side view the air pressure regulator of FIG. 12A.

The air pressure regulator 70 is shown in FIGS. 12A and 1213. The air pressure regulator 70 may be a diaphragm type pressure regulator, and includes a pressure gauge 72 to monitor the pressure level, as well as a rotatable pressure adjustment knob 74 configured to adjust the pressure level to a desired amount. The air pressure regulator 70 is associated with a high flow solenoid configured to turn the pump on and off, and having a flow coefficient of approximately 1.0 cv. Accordingly, when the pump strokes, the time required to re-pressurize is about 3 ms.

The adhesive tracking system 37 further uses the product detector 90 to determine product counts. The product detector may be mounted with a field of view that images products along the assembly line or detects breaks between products along the assembly line. For instance, the product detector 90 can be installed on the production line and mounted just ahead of the first dispensing location. The product detector 90 is configured to sense the presence of a product to which the adhesive is applied. As illustrated in FIG. 1, the product detector 90 is electrically connected to the controller 28. In other implementations, the product detector 90 may be electrically connected to the flow meter 80, to the manifold 26, or to a separate control unit (not shown) in other implementations. The controller includes a processor in electrical communication with both the flow meter 80 and the product detector 90 in order to monitor the adhesive flow output. In other implementations, the processor may be included, for example, in the manifold 26 or in a separate control unit. The measurement and reporting data collected by the adhesive tracking system can be used to improve process control of the hot melt adhesive system 10.

The processor determines a start time and an end time for application of the adhesive to the product based on the presence of the product received from the at least one product detector 90. The processor also receives the amount of the adhesive flowing out of the flow outlet 85 of the flow meter 80 at all times. The processor then associates the amount of adhesive that flows out of the flow meter 80 from the start time to the end time with the product. For instance, the product detector 90 senses products from leading edge to ending edge as they move along the production line, during which time the adhesive output from the flow meter 80 is accordingly accumulated. The processor may further calculate a weight of the adhesive dispensed from the flow outlet 85 of the flow meter 80 based on the received amount, and/or calculate a volume of the adhesive dispensed from the flow outlet 85 of the flow meter 80 based on the received amount.

During operation of the adhesive tracking system 37, adhesive may be measured over the product detector's 90 pitch to provide an average adhesive weight per product, even if there are multiple dispensing stations in different locations on the product line. Moreover, a fixed product skip count may be used to ignore products at start up to ensure that all applicators 48, 50 are applying adhesive before the adhesive tracking system 37 begins monitoring products. Such a skip count should be long enough so that all adhesive applicators 48, 50 start dispensing the adhesive before verification starts. The skip count is programmable down to zero in order to disable skipping for production lines that do not have products between gluing stations.

The amount of adhesive applied to products can be averaged over two or more products. In one implementation, for example, the processor determines a start time and an end time for the application of the adhesive to four products. The processor receives the amount of the adhesive flowing out of the flow outlet 85 of the flow meter 80 from the start time to the end time. The processor then calculates an average amount of adhesive applied to the number of products detected by the product detector 90 from the start time to the end time, and associates an average amount of the adhesive with each of the products.

The processor is therefore able to determine a total amount of adhesive dispensed on the product, and also calculate a running average amount of adhesive dispensed, or added-on, per product. Additionally, the processor may trigger a notification alarm when the average amount of adhesive per product falls outside a user defined range, such as a predetermined alarm threshold parameter. Such an alarm can be generated for both high and low thresholds. The number of products that are allowed to pass with either too-high or too-low output is also user-adjustable. In particular, the processor can determine a number of consecutive products having an average amount of adhesive that is outside a predetermined threshold parameter, and trigger the alarm when the aforementioned consecutive number of products exceeds a predetermined alarm delay parameter. The notification alarm may be an audible signal or a visible signal for alerting the user. Further, the alarm threshold parameter can be determined based on the average amount of adhesive applied to the two or more products during a learning process. For example, the desired amount of adhesive applied to the product may be learned or manually input by a user.

The processor determines the total amount of adhesive dispensed for all learned products and calculates the average amount of adhesive add-on per product during the learning process. This average amount of adhesive applied is then used to determine the alarm thresholds. For instance, the alarm threshold may be user adjustable. The high alarm point is independent from the low alarm point. The notification alarm is enabled upon completion of the learning process.

Also during operation, a minimum number of products, such as the first forty products, may not be used to calculate the average amount of adhesive applied per product when the production line is first started. Skipping products at start-up allows all the adhesive applicators 48, 50 to be active before calculating the average amount of adhesive add-on per product. The user may set the number of products skipped. For example, a setting of "0" disables skipping products for those systems that do not have more than one product between all adhesive applicators, such as for case sealing. Additionally, products may be skipped when a product signal has not been seen for an amount of time, such as ten seconds, which is adjustable by the user. It should be appreciated that the process of skipping products may have priority over the learning process. For example, the process of skipping products may be performed before starting the learning process even if the learning process is selected but the products need to be skipped.

The average amount of adhesive applied per product is determined based on the dispensing period defined by the start time and end time of the adhesive flow detected by the product detector 90. The start and end times of the adhesive detected by the product detector for a plurality of products define a corresponding series of dispensing periods. The processor calculates a running average amount of the adhesive added on to each product for each dispensing period.

For example, the number of products to average together for the average product add-on calculations can be based on how many products it takes to achieve a 2% resolution in adhesive add-on. As previously described, the number of products to average will be determined during the learning process and can be adjusted by the user after the learning process. A 2% resolution may be achieved when the total number of pulses from the flow meter is fifty or higher for N products, where N is the number of products to average for obtaining the average amount of adhesive added-on. In another example, if the learning process uses four products and the total number of flow meter pulses seen during the learning process is twenty-one, then the number of products to average together for the add-on average would be: four products seen (2%*twenty-one pulses seen)=9.5 products, which is then rounded up to the next highest integer and results in 10 products to average together. Thus, the amount of adhesive is averaged over a number of products to calculate a target value.

The average amount of adhesive dispensed on the products may be represented by the applied weight per product or the average volume of adhesive dispensed per product over time. As previously explained above, if the running average of adhesive applied per product is determined to be outside the alarm threshold and the number of consecutive out-of-tolerance products, i.e. those which fall outside the upper or lower thresholds, exceeds a value determined by the alarm delay parameter, such as the user-allowed number of out-of-tolerance products, then the processor triggers an alarm to notify the user. In some implementations, the alarm output signal can trigger the controller 28 to stop production if the adhesive dispensing deviates beyond user-specified upper and lower limits.

The measured weights will allow the end user to optimize adhesive application. Moreover, the user can set adhesive quantity band limits to ensure process control and identify pattern volume inconsistencies. The user can therefore optimize the amount of adhesive applied to every product and reject products that have too much or too little adhesive applied thereto. Moreover, the user can also detect operational defects which reduce flow, such as solenoid and module failures. Other operation defects may include clogged nozzles, which the user may fix by increasing pressure or performing maintenance.

Further, a calibration factor (i.e., K-factor) allows fine-tuning of the flow meter 80 for different operating conditions. For instance, the actual adhesive weight from one or more products is measured and compared to the displayed adhesive weight. The new K-factor value can then be calculated using the formula: New K-factor=Old K-factor*Displayed Weight/Actual Weight.

The user interface 29 of the adhesive tracking system 37 is in electrical communication with the controller 28 and includes a display screen that provides real time data to the user, including the average amount of adhesive add-on per product, the total amount of adhesive add-on, the average amount of adhesive add-on per hour, the total product count and defective product count, and alarm status and total alarms. Additionally, a USB port or other electronic media reader may be provided in communication with the processor for copying captured data logs and for providing access for system upgrades. Such data logs may be maintained and stored for retrieval, for example, daily, weekly, or quarterly.

These specific implementations described above are for illustrative purposes and are not intended to limit the scope of the disclosure as otherwise described and claimed herein. Modification and variations from the described implementations may exist.

What is claimed is:

1. A hot melt adhesive system, comprising:
    an adhesive supply holding solid or semi-solid hot melt adhesive;
    a heater associated with the adhesive supply for melting the solid or semi-solid hot melt adhesive into a liquid hot melt adhesive;
    a first manifold in fluid communication with the adhesive supply;
    a pump for pumping the liquid hot melt adhesive into the first manifold; and
    an adhesive tracking system for monitoring an output of the liquid hot melt adhesive, wherein the adhesive tracking system includes a single flow meter that is configured to measure an amount of the liquid hot melt adhesive that flows from the first manifold,
    wherein the flow meter is configured to receive hot melt adhesive from the first manifold and configured to discharge the hot melt adhesive back into the first manifold, and
    wherein the flow meter is secured to the first manifold, downstream of the pump.

2. The hot melt adhesive system of claim 1, wherein the flow meter is configured to measure an entirety of the hot melt adhesive that flows into or out of the first manifold.

3. The hot melt adhesive system of claim 2, wherein the flow meter is mounted directly to the first manifold, downstream of the pump.

4. The hot melt adhesive system of claim 2, wherein the flow meter is removable from the first manifold.

5. The hot melt adhesive system of claim 2, wherein 1) a flow inlet of the flow meter is configured to directly receive the liquid hot melt adhesive from the first manifold, and/or 2) a flow outlet of the flow meter is configured to directly discharge the liquid hot melt adhesive into the first manifold.

6. The hot melt adhesive system of claim 2, further comprising a plurality of adhesive applicators that are configured to receive the hot melt adhesive from the first manifold and configured to apply the liquid hot melt adhesive to a substrate, and wherein the flow meter measures all of the hot melt adhesive that is received by the plurality of adhesive applicators.

7. The hot melt adhesive system of claim 2, wherein the flow meter comprises:
    a pair of rotatable gears that are configured to rotate in an opposite direction relative to one another to create a positive displacement of hot melt adhesive through the flow meter; and
    at least one sensor configured to measure a rotation of the pair of rotatable gears.

8. The hot melt adhesive system of claim 1, wherein the adhesive tracking system further comprises:
    a product detector configured to sense a presence of a product to which the adhesive is applied, to determine a parameter of the product, and to determine a product count,
    wherein the adhesive tracking system is configured to associate, based on data that includes the determined parameter of the product and the product count, the measured amount of the adhesive flowing out of the flow meter with the sensed product, and the adhesive tracking system is configured to compare the associated amount of adhesive with a predetermined range to determine if the associated amount is outside the predetermined range.

9. The hot melt adhesive system of claim 1, further comprising:
    an air pressure regulator for regulating a flow of air into the pump from an air supply.

10. The hot melt adhesive system of claim 9, wherein the air pressure regulator comprises a diaphragm style regulator.

11. The hot melt adhesive system of claim 1, wherein the pump is the only pump that is configured to provide the liquid hot melt adhesive into the first manifold, wherein the single flow meter is downstream of the pump and comprises a flow inlet and a flow outlet, and wherein the flow inlet is configured to receive the liquid hot melt adhesive such that a flow rate of the liquid hot melt adhesive that is pumped out of the pump is equal to a flow rate of the liquid hot melt adhesive received by the flow inlet.

12. The hot melt adhesive system of claim 1, further including a dispensing unit that includes the adhesive supply,
    wherein the adhesive tracking system further comprises:
    an auxiliary manifold in fluid communication with the dispensing unit;
    the flow meter being in fluid communication with and mounted to the auxiliary manifold;
    a product detector configured to sense a presence of a product to which the adhesive is applied; and
    a controller in communication with the flow meter and the product detector, the controller having a processor configured to determine a total amount of the adhesive dispensed and an average amount of liquid adhesive dispensed per product.

13. The hot melt adhesive system of claim 1, wherein the flow meter is mounted directly to the first manifold, downstream of the pump.

14. A hot melt adhesive system, comprising:
    an adhesive supply holding solid or semi-solid hot melt adhesive;
    a heater associated with the adhesive supply for melting the solid or semi-solid hot melt adhesive into a liquid hot melt adhesive;
    a first manifold in fluid communication with the adhesive supply;
    a pump for pumping the liquid hot melt adhesive into the first manifold;
    an adhesive tracking system for monitoring an output of the liquid hot melt adhesive, wherein the adhesive tracking system includes a single flow meter that is configured to measure an amount of the liquid hot melt adhesive that flows from the first manifold; and
    a dispensing unit that includes the adhesive supply,
    wherein the adhesive tracking system further comprises:
    an auxiliary manifold in fluid communication with the dispensing unit;
    the flow meter being in fluid communication with and mounted to the auxiliary manifold;

a product detector configured to sense a presence of a product to which the adhesive is applied; and a controller in communication with the flow meter and the product detector, the controller having a processor configured to determine a total amount of the adhesive dispensed and an average amount of liquid adhesive dispensed per product.

15. The hot melt adhesive system of claim 14, wherein the auxiliary manifold is directly mounted to the dispensing unit; and wherein the flow meter comprises a housing body having a hollow central recess.

16. The hot melt adhesive system of claim 14, wherein the auxiliary manifold is remotely mounted to the dispensing unit.

17. The hot melt adhesive system of claim 14, further comprising at least one hose, in fluid communication with the auxiliary manifold and at least one adhesive applicator, for transporting the liquid hot melt adhesive from the auxiliary manifold to the at least one adhesive applicator.

18. The hot melt adhesive system of claim 17, wherein the flow meter is fitted to an end of the at least one hose at a location proximal the at least one adhesive applicator.

* * * * *